(12) United States Patent
Shinozaki

(10) Patent No.: US 8,131,958 B2
(45) Date of Patent: Mar. 6, 2012

(54) STORAGE SYSTEM, STORAGE DEVICE, AND DATA UPDATING METHOD USING A JOURNAL VOLUME

(75) Inventor: Toshihiko Shinozaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1042 days.

(21) Appl. No.: 12/010,981

(22) Filed: Jan. 31, 2008

(65) Prior Publication Data

US 2009/0132615 A1    May 21, 2009

(30) Foreign Application Priority Data

Nov. 19, 2007    (JP) ................................ 2007-299478

(51) Int. Cl.
*G06F 12/00* (2006.01)
*G06F 13/00* (2006.01)
*G06F 13/28* (2006.01)

(52) U.S. Cl. ................................ 711/162; 711/E12.103
(58) Field of Classification Search .................. None
See application file for complete search history.

(56) References Cited

U.S. PATENT DOCUMENTS

| 7,318,134 | B1 * | 1/2008 | Oliveira et al. | 711/162 |
| 2003/0135783 | A1 * | 7/2003 | Martin et al. | 714/13 |
| 2006/0174076 | A1 * | 8/2006 | Takeda et al. | 711/162 |
| 2007/0067586 | A1 * | 3/2007 | Mikami | 711/162 |
| 2007/0162513 | A1 * | 7/2007 | Lewin et al. | 707/200 |

FOREIGN PATENT DOCUMENTS

JP    2007-080131    9/2005

\* cited by examiner

*Primary Examiner* — Pierre-Michel Bataille
*Assistant Examiner* — Matthew Chrzanowski
(74) *Attorney, Agent, or Firm* — Volpe and Koenig, P.C.

(57) ABSTRACT

A storage device including a data volume for storing data sent from a host computer and a journal volume to which update data in the data volume is written in a chronologically identifiable manner, comprises an update unit updating update data from a data restoration unnecessary period, from among the data restoration necessary period and the data restoration unnecessary period that set from an external device, in the journal volume.

9 Claims, 16 Drawing Sheets

FIG.5

JOURNAL MANAGEMENT TABLE

35

| ID | WRITE ACCEPT TIME | WRITE DESTINATION ADDRESS | WRITE DATA SAVE LOCATION ADDRESS |
|---|---|---|---|
| 0 | 2007/8/3 15:00 | 0x00500 | 0x102000 |
| 1 | 2007/8/3 12:00 | 0x00400 | 0x102000 |
| 2 | 2007/8/3 9:00 | 0x00300 | 0x101900 |
| 3 | 2007/8/3 6:00 | 0x00200 | 0x101800 |
| 4 | 2007/8/3 3:00 | 0x00100 | 0x101700 |
| 5 | 2007/8/3 0:00 | 0x00000 | 0x101600 |
| 6 | 2007/8/2 21:00 | 0x00700 | 0x101500 |
| 7 | 2007/8/2 18:00 | 0x00600 | 0x101400 |
| 8 | 2007/8/2 15:00 | 0x00500 | 0x101200 |
| 9 | 2007/8/2 12:00 | 0x00400 | 0x101100 |
| 10 | 2007/8/2 9:00 | 0x00300 | 0x101000 |
| 11 | 2007/8/2 6:00 | 0x00200 | 0x100900 |
| 12 | 2007/8/2 3:00 | 0x00100 | 0x100800 |
| 13 | 2007/8/2 0:00 | 0x00000 | 0x100700 |
| 14 | 2007/8/1 21:00 | 0x00700 | 0x100600 |
| 15 | 2007/8/1 18:00 | 0x00600 | 0x100500 |
| 16 | 2007/8/1 15:00 | 0x00500 | 0x100400 |
| 17 | 2007/8/1 12:00 | 0x00400 | 0x100300 |
| 18 | 2007/8/1 9:00 | 0x00500 | 0x100200 |
| 19 | 2007/8/1 6:00 | 0x00200 | 0x100100 |
| 20 | 2007/8/1 3:00 | 0x00100 | 0x100000 |
| 35A | 35B | 35C | 35D |

JOURNAL MANAGEMENT CACHE TABLE

| ID | WRITE ACCEPT TIME | WRITE DESTINATION ADDRESS | WRITE DATA SAVE LOCATION ADDRESS |
|---|---|---|---|
| 0 | 2007/8/1 15:00 | 0x00500 | 0x100400 |
| 1 | 2007/8/1 12:00 | 0x00400 | 0x100300 |
| 2 | 2007/8/1 9:00 | 0x00500 | 0x100200 |
| 3 | 2007/8/1 6:00 | 0x00200 | 0x100100 |
| 4 | 2007/8/1 3:00 | 0x00100 | 0x100000 |
| 5 | | | |
| 6 | | | |
| 7 | | | |

RECOVERY PERIOD MANAGEMENT TABLE 37

| ID | RECOVERY PERIOD START TIME | RECOVERY PERIOD END TIME | MERGE FLAG | REPLICATION FLAG |
|---|---|---|---|---|
| 0 | 2007/8/3 0:00 | 2007/8/3 15:00 | Off | Off |
| 1 | 2007/8/2 0:00 | 2007/8/2 21:00 | Off | On |
| 2 | 2007/8/1 15:00 | 2007/8/1 21:00 | On | On |
| 3 | 2007/8/1 3:00 | 2007/8/1 15:00 | Off | Off |
| | | | | |

RECOVERY PERIOD SETTING SCREEN

TARGET VOLUME — PRIMARY VOLUME 1

SETTING

2007/8/2 0:00 ~ 2007/8/2 21:00

○ MERGE
◉ REPLICATE

[<<] [>>]

RECOVERY PERIOD LIST

| ID | RECOVERY PERIOD START TIME | RECOVERY PERIOD END TIME | MERGE FLAG | REPLICATION FLAG |
|----|---|---|---|---|
| 0 | 2007/8/3 0:00 | 2007/8/3 15:00 | Off | Off |
| 1 | 2007/8/2 0:00 | 2007/8/2 21:00 | Off | On |
| 2 | 2007/8/1 15:00 | 2007/8/1 21:00 | On | On |
| 3 | 2007/8/3 12:00 | 2007/8/3 3:00 | Off | Off |

[OK]   [Cancel]

FIG.16
JNL MERGE IN RECOVERY UNNECESSARY PERIOD
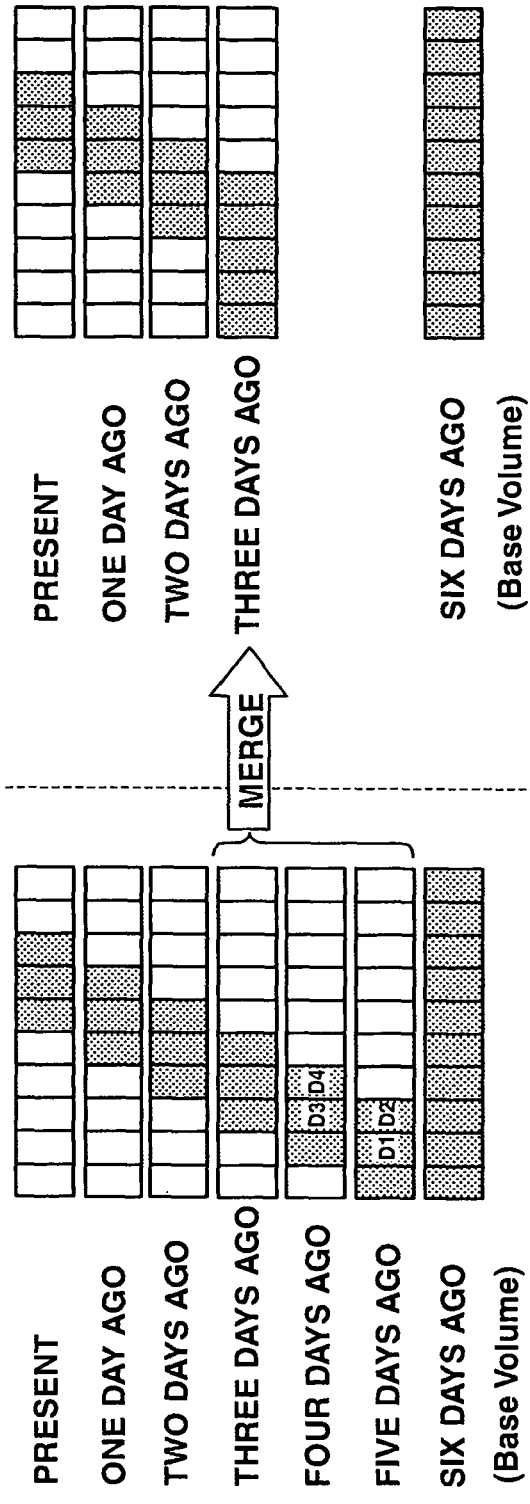
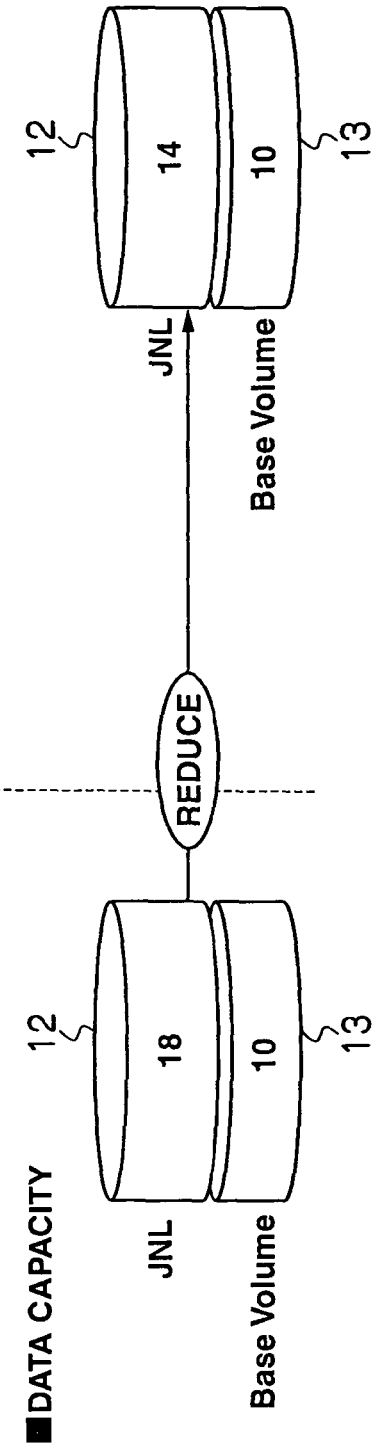

FIG.17
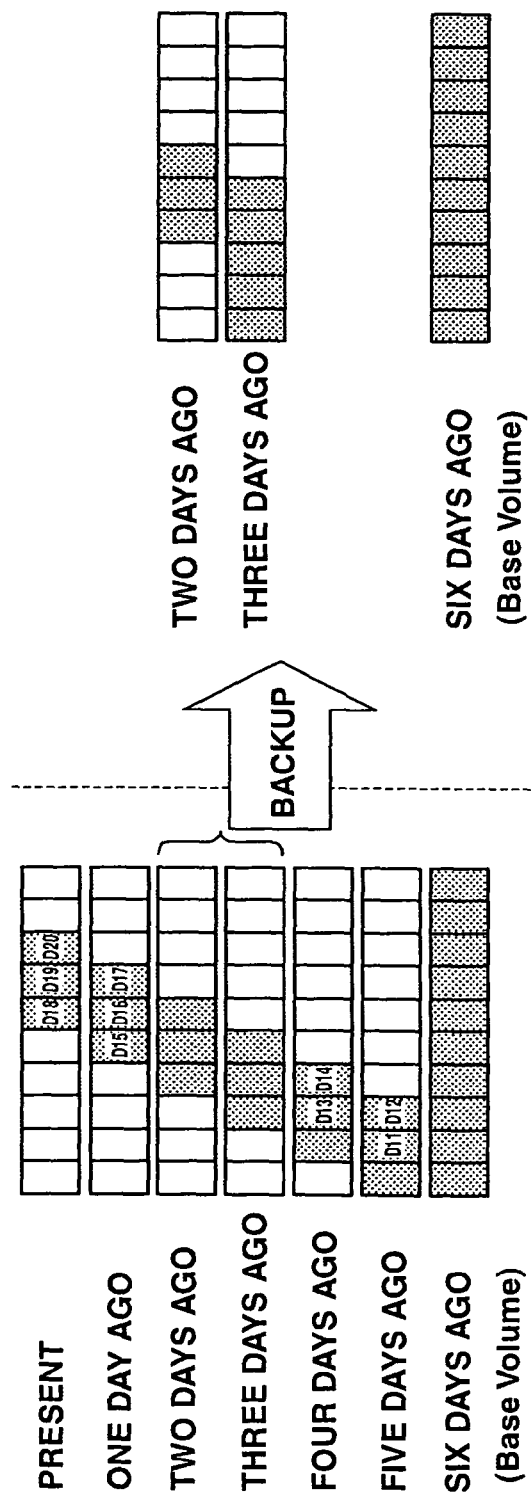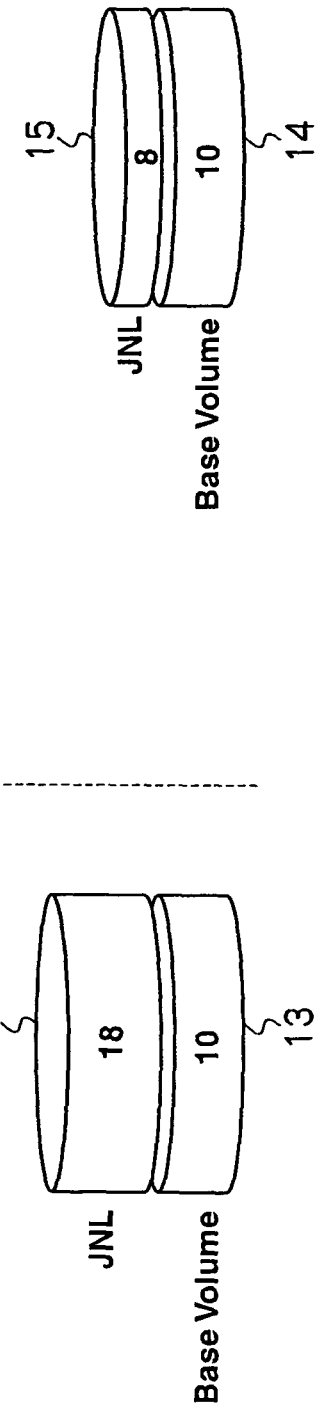

STORAGE SYSTEM, STORAGE DEVICE, AND DATA UPDATING METHOD USING A JOURNAL VOLUME

CROSS-REFERENCES TO RELATED APPLICATIONS

This application relates to and claims priority from Japanese Patent Application No. 2007-299478, filed on Nov. 19, 2007, the entire disclosure of which is incorporated herein by reference.

BACKGROUND

The invention relates generally to a storage system, a storage device and a data updating method, and it is particularly suitable for application in, for example, a storage device managing data backup or restoration in a storage system.

Conventionally, as a technique for data backup or restoring, for example, there are known techniques to restore data at any given point in time: by combining a technique to restore data by retrieving the snapshot of a logical volume and using the snapshot (hereinafter referred to as the "snapshot technique"); and by retrieving the journal of a logical volume and using the journal (hereinafter referred to as the "journal technique").

A snapshot is the image of a logical volume at a certain point in time. Also, a journal is the history of data written to a logical volume.

According to the snapshot technique, normally the snapshot itself can be used as restored data, so data can be restored in a short time. However, since many snapshots are necessary to be retrieved in order to restore data at any time over many points in time, that will cause a heavy workload in the system.

On the other hand, according to the journal technique, even when data needs to be restored at any time over many points in time, only the journal written to a logical volume has to be recorded, so the workload will be smaller than the snapshot technique. However, in order to restore data at a certain point in the past, all data at every point up to that certain point in the past needs to be recorded in order, so it usually takes longer than the snapshot technique.

Recently, a technique to operate the snapshot technique and the journal technique by switching them depending on the situation has been suggested (see 2007-080131 A).

As a technique of this sort, there is a CDP (Continuous Data Protection) technique in which data at any given point in time can be restored by chronologically backing up update data for every piece of write data as journal(s). As an example of the CDP, data at a certain point in the past (hereinafter referred to as the "recovery point") is held as a base volume, update data (a journal) is arbitrarily applied to the base volume, and thereby data at any given point in time is restored.

However, there is a problem where, when a time period from a recovery point to recovery point extends over a long period of time, a journal volume capacity for storing journals has to be expanded in accordance with the aforementioned time period even though there is the period during which data restoration is not necessary.

When using snapshots, there is also a problem where volume capacity has to be expanded in accordance with the number of generations for which snapshots are implemented even though there is the period during which data restoration is not necessary.

As described above, in conventional techniques, data in the period during which data restoration is not necessary for a user is also capable of being restored, and data in that period cannot be deleted, so there is a problem where logical volume capacity cannot be used effectively.

SUMMARY

The current invention has been devised in consideration of the above-described points, and it is an object of the present invention to provide a storage system, a storage device and a data updating method capable of the efficient utilization of logical volume capacity.

In order to solve the problem, according to an aspect of the invention, a storage system comprises: a first storage device including a first data volume for storing data sent from a host computer and a first journal volume to which update data in the first data volume is written in a chronologically identifiable manner; a second storage device including a second data volume and the second journal volume that holds a replica of a first data volume and the first journal volume; and a management device managing the first storage device, wherein the management device comprises, a setting unit setting a data restoration necessary period and a data restoration unnecessary period, and sending to the first storage device information on a data restoration necessary period and a data restoration unnecessary period, and wherein the first storage device comprises, an update unit updating update data from a data restoration unnecessary period, from among the data restoration necessary period and the data restoration unnecessary period that set in the setting unit, in the first journal volume.

Also according to an aspect of the invention, a storage device, including a data volume for storing data sent from a host computer and a journal volume to which update data in the data volume is written in a chronologically identifiable manner, comprises an update unit updating update data from a data restoration unnecessary period, from among the data restoration necessary period and the data restoration unnecessary period set from an external device, in the journal volume.

Furthermore, according to an aspect of the invention, A data updating method for a storage device that includes a data volume for storing data sent from a host computer and a journal volume to which update data in the data volume is written in a chronologically identifiable manner, comprises the step of updating update data from a data restoration unnecessary period, from among the data restoration necessary period and the data restoration unnecessary period that set from an external device, in the journal volume.

Accordingly, update data in the period during which data restoration is not necessary for a user can be prevented from being held in a first journal volume, and the amount used of the first journal volume is reduced, so that the capacity of the first journal volume can be efficiently utilized.

According to the present invention, a storage system, a storage device and a data updating method capable of efficiently utilizing a logical volume capacity can be provided.

Other aspects and advantages of the invention will be apparent from the following description and the appended claims.

BRIEF DESCRIPTION OF THE DRAWINGS

FIG. 5 is a concept diagram for explaining the configuration of a journal management table.

FIG. 6 is a concept diagram for explaining the configuration of a journal management cache table.

FIG. 7 is a concept diagram for explaining the configuration of a recovery period management table.

FIG. 8 is a block diagram showing the configuration of a recovery period setting screen.

FIG. 16 is a concept diagram for explaining the brief overview of journal replication processing.

FIG. 17 is a concept diagram for explaining the brief overview of recovery period merge processing.

DETAILED DESCRIPTION OF PREFERRED EMBODIMENTS

An embodiment of the present invention will be described below with reference to the attached drawings. It should be understood that the present invention is not limited to this embodiment.

Figure 1:
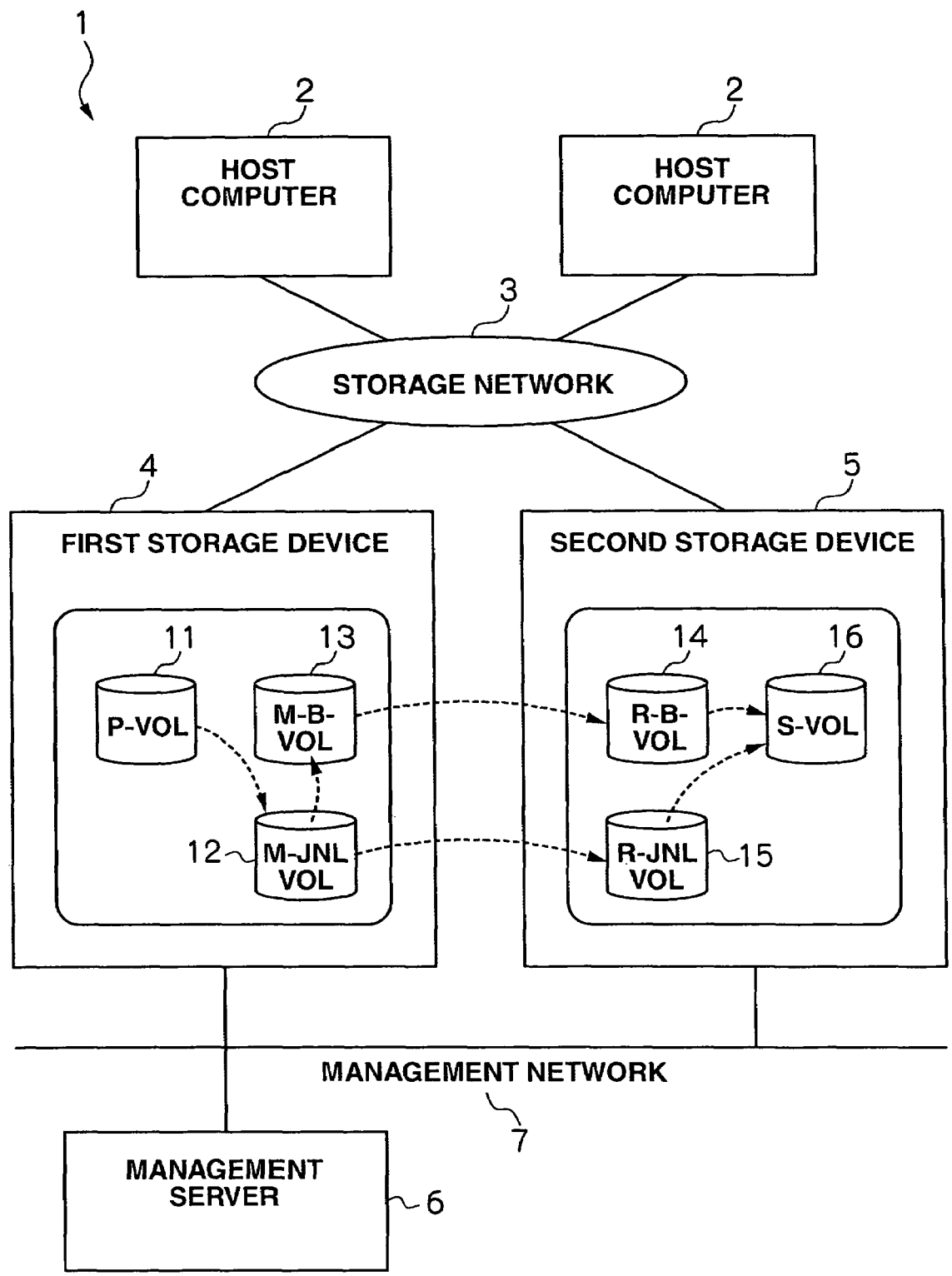
FIG. 1 is a block diagram showing the configuration of a storage system according to an embodiment of the invention.

FIG. 1 shows a storage system 1 (including a computer) according to the embodiment. The storage system 1 is configured by connecting a host computer 2 via a storage network 3 to a first storage device 4 and a second storage device 5.

The host computer 2 is a computer, such as a personal computer, a workstation, or a main frame, etc. The host computer 2 performs various kinds of processing by executing application programs corresponding to various operations or uses such as a database, etc. The number of host computers 2 connected via the storage network 3 to the first storage device 4 and the second storage device 5 is not limited. Also, the host computer 2 sends and receives commands and data that are necessary for inputs and outputs in information processing to/from the first storage device 4; writes and updates data; and sends write requests for changing data.

The first storage device 4 receives commands and data sent via the storage network 3, executes predetermined processing, and sends a predetermined response to the host computer 2. The second storage device 5 holds a replica of data on the first storage device 4. The second storage device 5 is normally located at a remote place (for descriptive purposes, referred to as the "remote site"), and distance is no object. Hereinafter, the first storage device 4 may be put into a "local site" or a "master end", while the second storage device 5 may be put into a "remote site" or a "remote end".

A management server 6 is a computer for managing the configurations, maintenance and performance of the first storage device 4 and the second storage device 5 via a management network 7. Also, the management server 6 sets the recovery periods, in between recovery points, during which data restoration is necessary and during which data restoration is not necessary (described later below). Incidentally, the storage system 1 may be configured not to use the management network 7 (for example, managing only the In-Band) by connecting the storage network 5 to the management server 6.

Next, a whole processing flow will be described below, and the details will be described later. The first storage device 4 stores data input from the host computer 2 to a primary volume (P-VOL) 11. Then, the first storage device 4 creates, when data is written to the primary volume 11, journal data which is management data for the update data of the input data, and writes the update data and journal data to a master end journal volume (M-JNL VOL) 12.

Following the above, the first storage device 4 provides, in order to protect data by using a CDP function, update data retained beyond the target retention period (at the time of the recovery point) to a master end base volume (M-B-VOL) 13. When data is written to the primary volume 11, the first storage device 4 writes update data and journal data again to the master end journal volume 12, and repeats the above-described processing.

Thus, the first storage device 4 provides data in the master end base volume 13 and update data in the master end journal volume 12 to the primary volume 11, so that data at any given point in time between the most recent recovery point and present can be restored.

In that case, the first storage device 4 updates (merges), at the moment described later below, update data from the period designated by a user during which data restoration is not necessary for a user in the master end journal volume 12. As a result, the first storage device 4 prevents update data in the data restoration unnecessary period for a user from being held in the master end journal volume 12, and the amount used of the master end journal volume 12 is reduced, so that the capacity of the master end journal volume 12 can be efficiently utilized.

Meanwhile, the first storage device 4 transfers, at the moment described later below, data in the master end base volume 13 to a remote end base volume (R-B-VOL) 14, and transfers update data and journal data in the master end journal volume 12 to a remote end journal volume (R-JNL VOL) 15.

In that case, the first storage device 4 updates (merges), at the moment described later below, update data from the period, which is designated by a user, during which data restoration is not necessary for a user in the master end journal volume 12, and then transfers update data from the period designated by a user during which data restoration is necessary for a user to a remote end journal volume 15. Incidentally, update data in the data restoration necessary period for a user may be backed up in the remote end journal volume 15.

Thus, the first storage device 4 prevents update data in the data restoration unnecessary period for a user from being held in the remote end journal volume 15, so that the capacity of the remote end journal volume 15 can be efficiently utilized. Also, the first storage device 4 transfers the minimum update data from the period designated by a user as a data restoration necessary period to the remote end journal volume 15, then the use of the band width of the storage network 3 is reduced, so that the band width of the storage network 3 can be efficiently utilized.

The second storage device 5 holds a data replica of the master end base volume 13 transferred from the first storage device 4 in the remote end base volume 14, and holds update data replicas and journal data replicas transferred from the first storage device 4 in the remote end journal volume 15.

In this way, the second storage device 5 provides data in the remote end base volume 14 and update data in the remote end journal volume 15 to a secondary volume (S-VOL) 16, so that data at any given point in time between the most recent recovery point and the moment described later below, except data in the data restoration unnecessary period for a user, can be restored.

Incidentally, the physical media described herein may be not only hard disk drives (including RAID), but also flash memory or magnetic tape, etc., however, it is not limited to these media.

Furthermore, there may be more than a pair of the primary volumes 11, the master end journal volumes 12, the master end base volumes 13, the remote end base volumes 14, the remote end journal volumes 15 and the secondary volumes 16. One master end journal volume 12 may have more than one master end base volume 13, and various other such combinations are possible.

Figure 2:
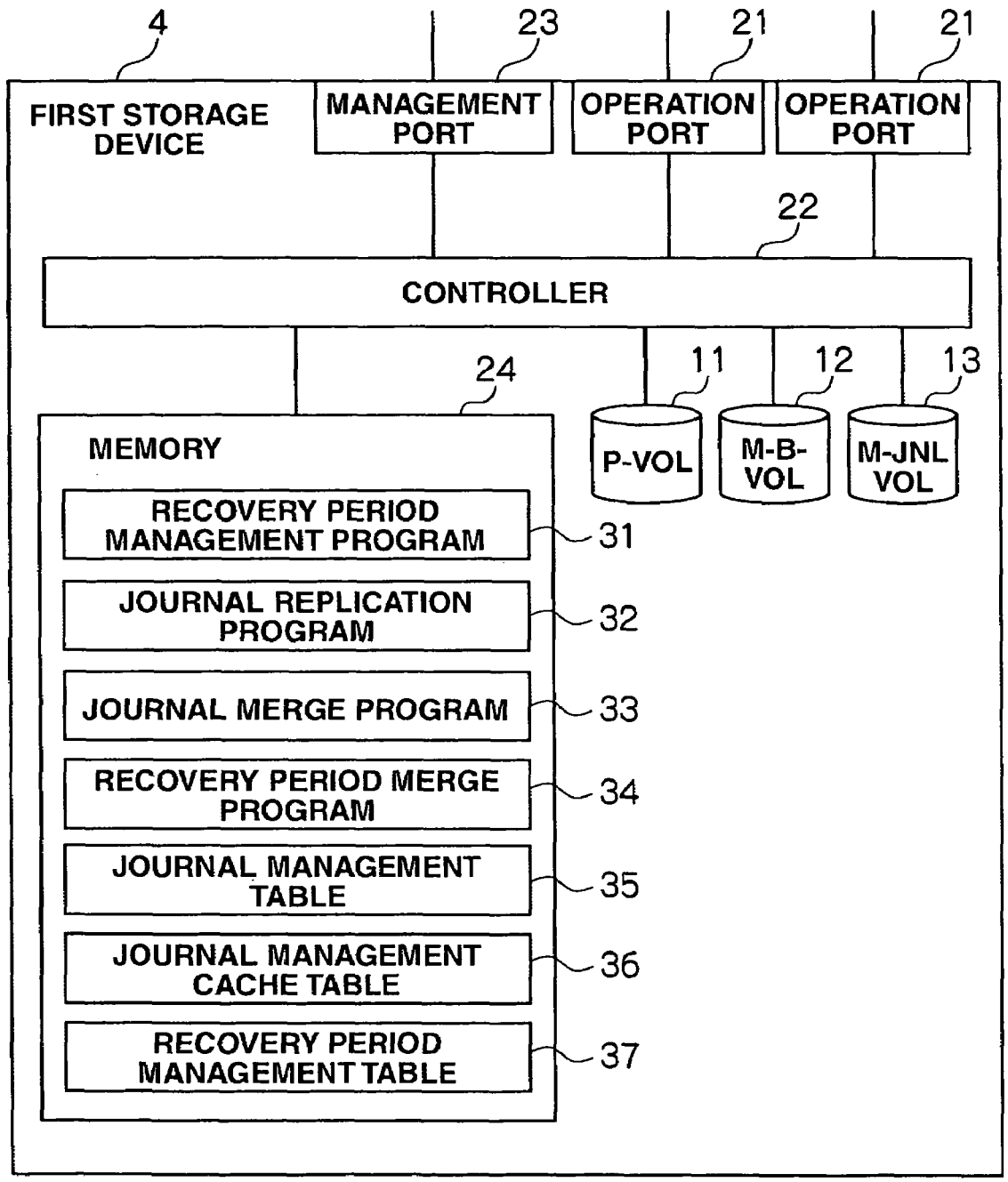
FIG. 2 is a block diagram showing the configuration of a storage device.

FIG. 2 shows the configuration of the interior of the first storage device 4. The controller 22 receives via an operation port 21 a data reference request or a data write request issued from the host computer 2 to the primary volume 11. The controller 22 performs, based on the association between the predetermined primary volume 11 and the host computer 2, data writing (Write) to the proper primary volume 11 or data reading (Read) from the proper primary volume 11. In that case, the controller 22 may rapidly perform I/O by using an internal high-speed cache.

The controller 22 also receives via a management port 23 a configuration setting, maintenance or recovery period setting request, etc. sent from the management server 6. In a configuration setting, the controller 22 updates configuration information held in an internal cache, etc., and then performs various changes such as a configuration change or an establishment of a copy relationship, etc. for the primary volume 11. Incidentally, the management port 23 may share the same port with the operation port 21.

Programs executed on the controller 22 and tables used by the controller 22 are stored in memory 24. In the present embodiment, the recovery point management program 31, journal replication program 32, journal merge program 33 and recovery point merge program 34 are stored in the memory 24. Also a journal management table 35, a journal management cache table 36 and a recovery period management table 37 are stored in the memory 24. The details of various programs and tables are described later below.

Figure 3:
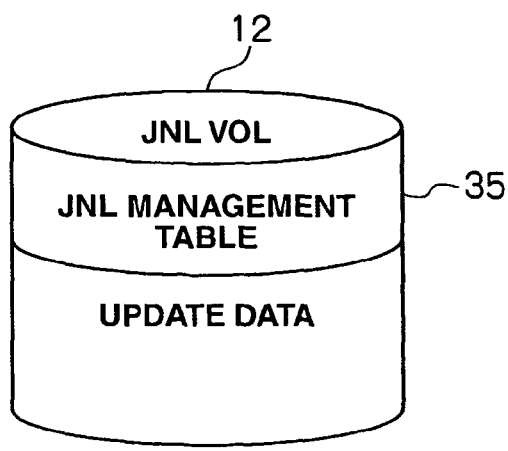
FIG. 3 is a block diagram showing the configuration of a master end journal volume.

FIG. 3 shows the configuration of the master end journal volume 12. The master end journal volume 12 consists of an area for storing the journal management table 35 and an area for storing update data. The controller 22 stores the journal management table 35 from the master end journal volume 12 to the memory 24.

The components of the second storage device 5, which is a remote site, are basically the same as those of the first storage device 4, except that it has different volumes, programs and tables in its memory and holds the replica of data in the first storage device 4, so their descriptions will be omitted.

Figure 4:
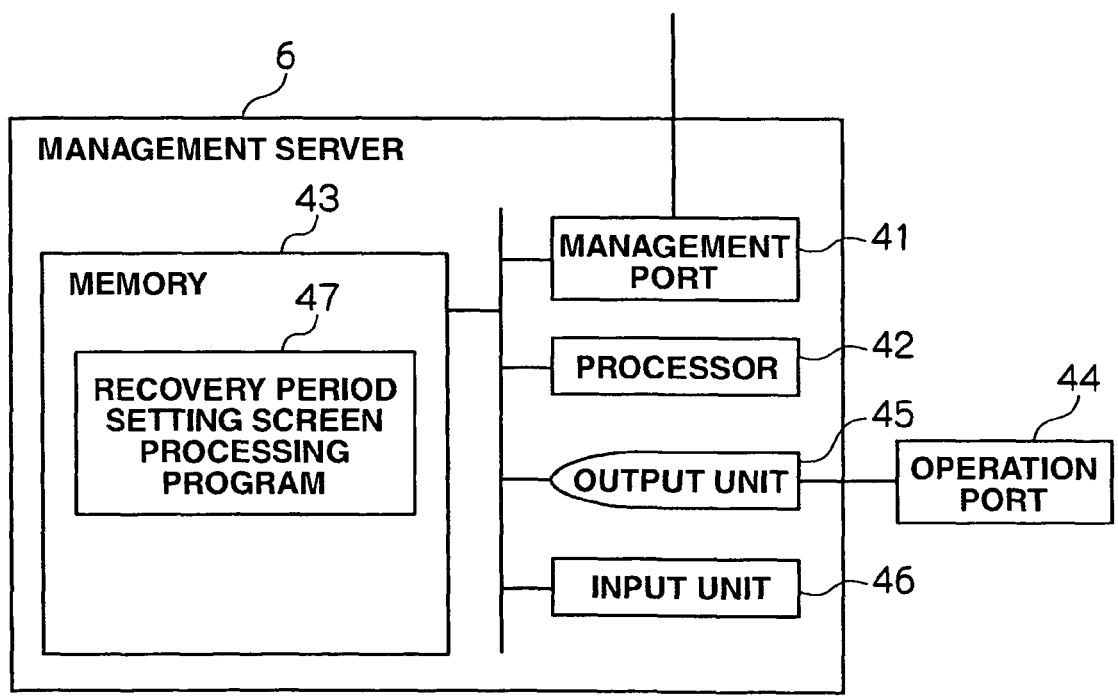
FIG. 4 is a block diagram showing the configuration of a management server.

FIG. 4 shows the configuration of the management server 6. The management server 6 includes a management port 41 for connecting to the management network 7; the processor 42; the memory 43; an output unit 45 connected to display monitor 44 for outputting a processing result described later below; and an input unit 46 connected to a keyboard, etc., for a user of the management server 6 to input instructions, and these components are interconnected via a circuit such as an internal bus, etc. A recovery period setting screen processing program 47 is stored in the memory 43. The details of the recovery period setting screen processing program 47 will be described later below.

FIG. 5 shows the configuration of the journal management table 35. The journal management table 35 stores journal data, and manages journal data and update data that corresponds to the aforementioned journal data. The journal management table 35 consists of an "ID" column 35A, a "WRITE ACCEPT TIME" column 35B, a "WRITE DESTINATION ADDRESS" column 35C and a "WRITE DATA SAVE LOCATION" column 35D.

An ID that uniquely identifies journal data is stored in the "ID" column 35A. A write accepted time, which is the time when the controller 22 received a write request and wrote update data to the primary volume 11, is stored in the "WRITE ACCEPT TIME" column 35B. A write destination address, which is an address of the primary volume 11 in which update data that corresponds to the aforementioned journal data is stored, is stored in the "WRITE DESTINATION ADDRESS" column 35C. A write data saving location address, which is an address of the master end volume 12 in which update data that corresponds to the aforementioned journal data is stored, is stored in the "WRITE DATA SAVE LOCATION" column 35D.

In that case, for example, the journal management table 35 shows that update data corresponding to journal data with an ID of "0" is data whose write accepted time is the write accepted time of "2007/8/3 15:00;" whose write destination address is the address of "0x00500;" and whose write data saving location address is the address of "0x102000." A journal management table 35 exists for every primary volume 11.

FIG. 6 shows the configuration of the journal management cache table 36. The journal management cache table 36 stores, when updating (merging) update data from the data restoration unnecessary period for a user, journal data temporarily, and manages journal data to be replicated and update data that corresponds to the aforementioned journal data. The journal management cache table 36 consists of an "ID" column 36A, a "WRITE ACCEPT TIME" column 36B, a "WRITE DESTINATION ADDRESS" column 36C and a "WRITE DATA SAVE LOCATION" column 36D.

As in the journal management table 35, the journal management cache table 36 stores an ID, a write accepted time, a write destination address and a write data saving location address in the corresponding columns. When update data from the data restoration unnecessary period for a user is updated (merged), a write accepted time in the journal management cache table 36 is updated so that the controller 22 receives a write request and writes update data to the primary volume 11 at the start of the data restoration necessary period for a user (described later below).

In that case, for example, the journal management cache table 36 shows that update data corresponding to journal data with an ID of "0" is data whose write accepted time is the write accepted time of "2007/8/1 15:00;" whose write destination address is the address of "0x00500;" and whose write data saving location address is the address of "0x100400." Incidentally, the aforementioned write accepted time is the time when the controller 22 received a write request and wrote update data to the primary volume 11; or the time updated so that the controller 22 receives a write request and writes update data to the primary volume 11 at the start of the data restoration necessary period for a user. A journal management cache table 36 exists for every primary volume 11.

FIG. 7 shows the configuration of the recovery period management table 37. The recovery period management table 37 manages whether or not to update (merge) update data from the recovery period, and whether or not to update (merge) and transfer the aforementioned update data to the remote end journal volume 15 when replicating. The recovery period management table 37 consists of an "ID" column 37A, a "RECOVERY PERIOD START TIME" column 37B, a "recovery period end time" column 37C, a "MERGE FLAG" column 37D and a "REPLICATION FLAG" column 37E.

An ID which uniquely identifies an entry in the recovery period management table 37 is stored in the "ID" column 37A. The start time of a recovery period is stored in the "RECOVERY PERIOD START TIME" column 37B. The end time of a recovery period is stored in the "RECOVERY PERIOD END TIME" column 37C. Information on whether or not updating (merging) update data from a recovery period for the aforementioned entry is stored in the "MERGE FLAG" column 37D. Information on whether or not updating (merging) and transferring update data from a recovery period for the aforementioned entry to the remote end journal volume 15 is stored the "REPLICATION FLAG" column 37E.

In that case, for example, the recovery period management table 37 shows that the recovery period for a entry with an ID of "0", whose the start time for the recovery period is "2007/8/3 0:00;" and whose the end time for the recovery period is "2007/8/3 15:00." Also, the recovery period for a entry with an ID of "0" has an "OFF(off)" merge flag and an "OFF(off)" replication flag, so update data from the recovery period will not be updated (merged). More specifically, these values indicate that the recovery period is a data restoration necessary period for a user.

Furthermore, in that case, for example, the recovery period management table 37 shows that the recovery period for a entry with an ID of "1", whose start time for the recovery period is "2007/8/2 0:00;" and whose end time for the recovery period is "2007/8/2 21:00." Also, the recovery period for a entry with an ID of "1" has an "OFF(off)" merge flag and an "ON(on)" replication flag, so update data from the recovery period will be updated (merged) and transferred to the remote end journal volume 15. More specifically, these values indicate that the recovery period is a data restoration unnecessary period for a user.

Moreover, in that case, for example, the recovery period management table 37 shows that the recovery period for a entry with an ID of "2," whose start time of the recovery period is "2007/8/1 15:00;" and whose end time of the recovery period is "2007/8/1 21:00." Also, the recovery period for a entry with an ID of "2" has an "ON(on)" merge flag and an "ON(on)" replication flag, so update data from the recovery period will be updated (merged) and transferred to the remote end journal volume 15. More specifically, these values indicate that the recovery period is a data restoration unnecessary period for a user.

Incidentally, the recovery period management table 37 exists for every primary volume 11.

FIG. 8 shows a recovery period setting screen 48 displayed on the display monitor 44. The recovery period setting screen 48 is used for setting, in accordance with an operating unit (not shown) operated by the user of the management server 6, whether or not to update (merge) update data from the recovery period; and whether or not to update (merge) and transfer the aforementioned update data to the remote end journal volume 15 when replicating. The recovery period setting screen 48 consists of a "TARGET VOLUME" column 48A, a "SETTING" column 48B, a left-arrow button 48C, a right-arrow button 48D, a "RECOVERY PERIOD LIST" column 48E, an OK button 48F and a Cancel button 48G.

An identification ID for the primary volume 11 whose recovery period is to be set is stored in the "TARGET VOLUME" column 48A. The start time and end time for a recovery period are stored in the "SETTING" column 48B. Also, a merge flag and a replication flag are selected in the "SETTING" column 48B. The left-arrow button 48C is pressed when selecting an entry in the "RECOVERY PERIOD LIST" column 48E and reflecting the selected entry to the "SETTING" column 48B. The right-arrow button 48D is pressed when inputting data into the "SETTING" column 48B and reflecting the input data in the "RECOVERY PERIOD LIST" column 48E. Information input to the "SETTING" columns 48B are listed in the "RECOVERY PERIOD LIST" column 48E. The OK button 48F is pressed when reflecting the setting for a recovery period, in the first storage device 4 and terminating the setting on the recovery period setting screen 48. The Cancel button 48G is pressed when terminating the setting on the recovery period setting screen 48 without reflecting the setting for a recovery period.

In accordance with an operating unit (not shown) operated by the user of the management server 6, the management server 6 displays, for example, when a "PRIMARY VOLUME 1" is entered into the "TARGET VOLUME" column 48A, a recovery period management table 37 for the primary volume 11 of the "PRIMARY VOLUME 1" on the recovery period setting screen 48.

Also, in accordance with an operating unit (not shown) operated by the user of the management server 6, for example, when the start time of a recovery period "2007/8/2 0:00" and the end time of a recovery period "2007/8/2 21:00" are entered into the "SETTING" column 48B; a replication flag is selected; and the right-arrow button 48D is pressed, the management server 6 displays information entered into the above-described "SETTING" column 48B on the recovery period setting screen 48 (the aforementioned information relates to the ID "2" in the "RECOVERY PERIOD LIST" column 48E).

Figure 9:
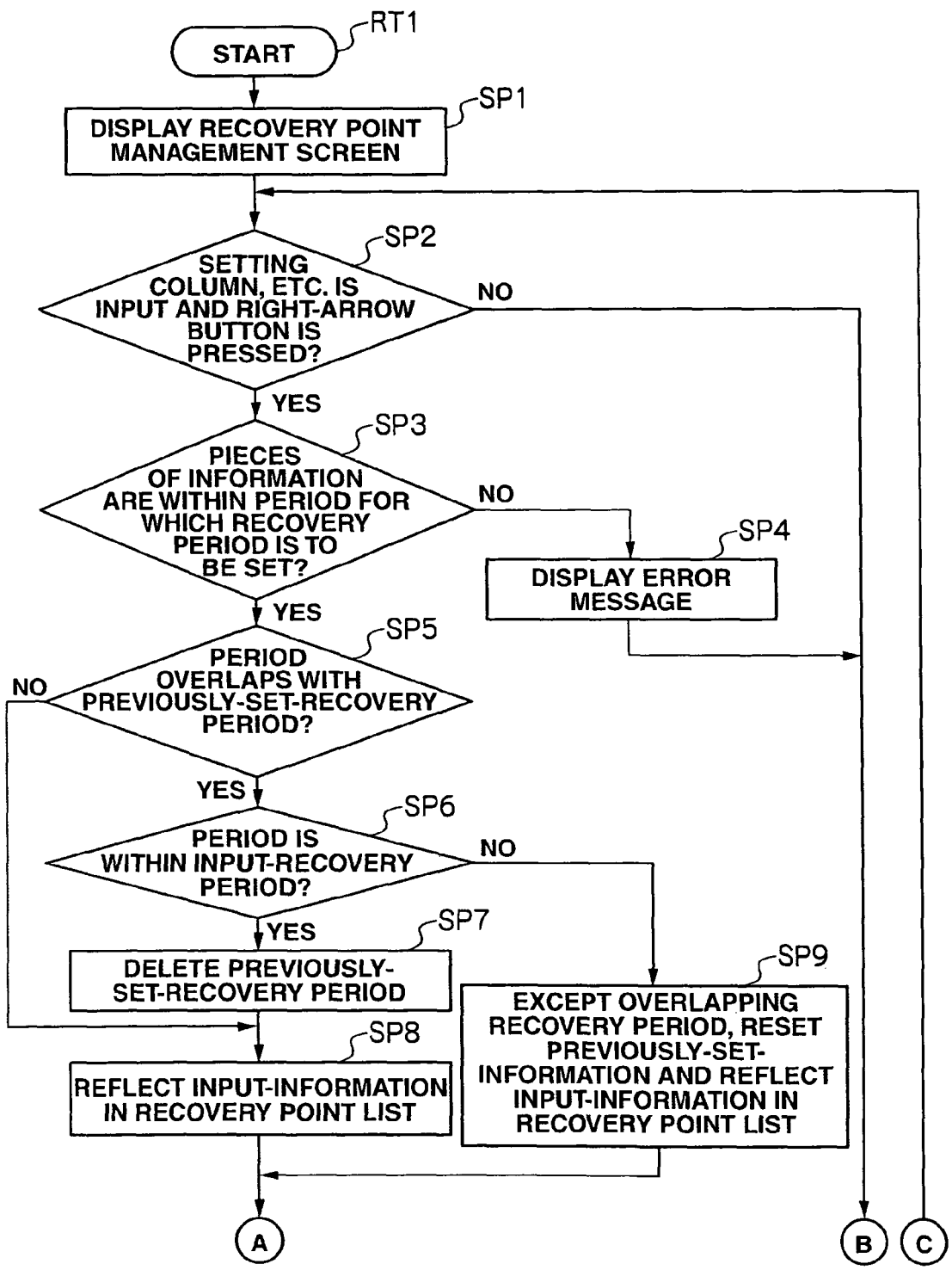
FIG. 9 is a flowchart illustrating a recovery period setting screen processing procedure.
Figure 10:
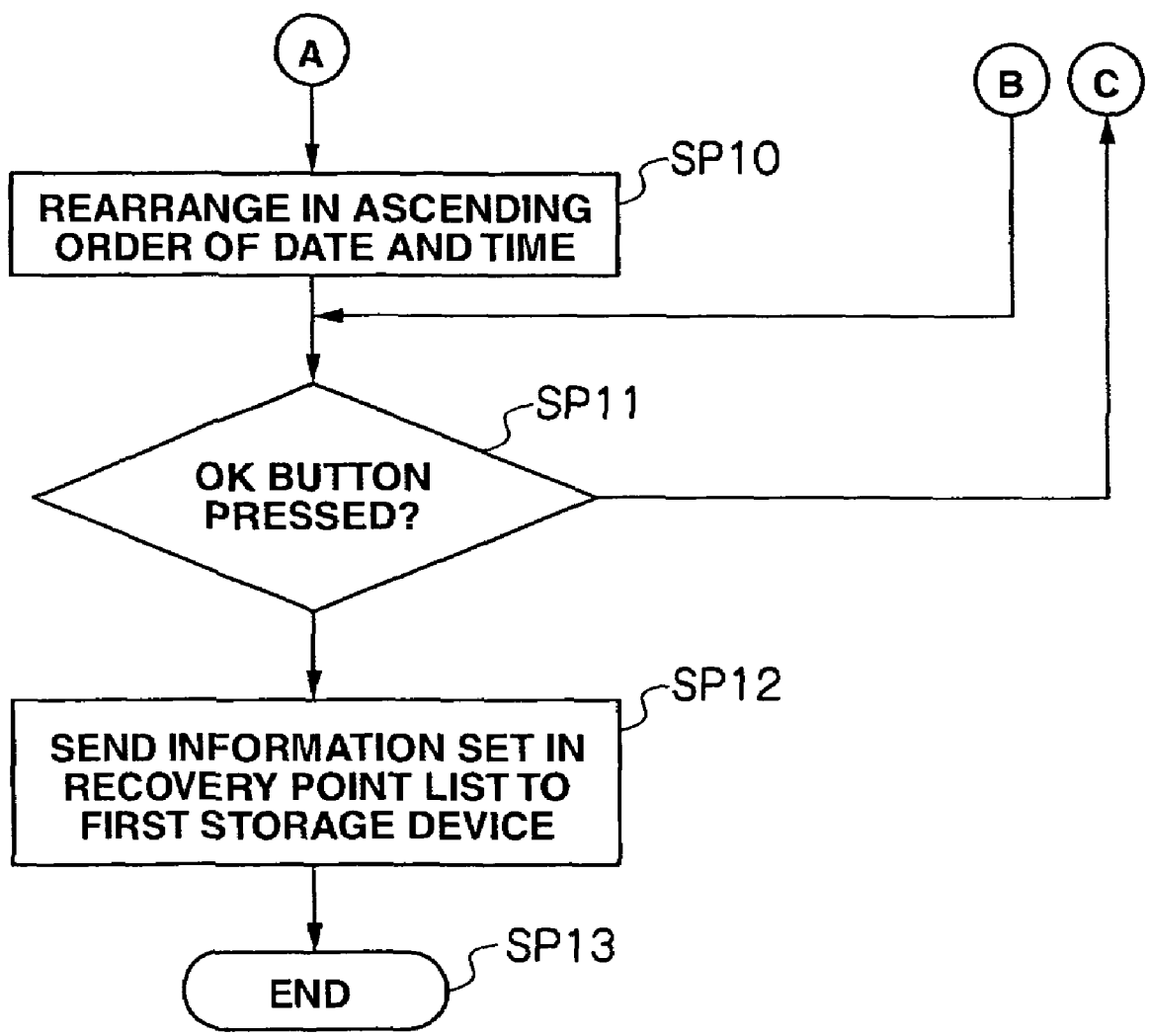
FIG. 10 is a flowchart illustrating a recovery period setting screen processing procedure.

FIGS. 9 and 10 are flowcharts illustrating an example of concrete processing procedures in the processor 42 of the management server 6, and the procedures relate to the recovery period setting screen processing in the management server 6 of the storage system 1.

For example, in accordance with an operating unit (not shown) operated by the user of the management server 6, the processor 42 of the management server 6 executes, when receiving a recovery period setting instruction, a recovery period setting screen processing program 47 for setting the recovery period of the selected primary volume 11, and displays the recovery period setting screen 48 on the display monitor 44 according to the recovery period setting screen processing procedure RT1 shown in FIGS. 9 and 10 (SP1).

Then, the processor 42 of the management server 6 checks, in accordance with an operating unit (not shown) operated by the user of the management server 6, whether or not information is entered in the "TARGET VOLUME" column 48A and the "SETTING" column 48B and the right-arrow button 48D pressed within a predetermined time frame (SP2). If information is entered in the "TARGET VOLUME" column 48A but the "SETTING" column 48B and the right-arrow button 48D is not pressed within the predetermined time frame (SP2: NO), the processor 42 of the management server 6 proceeds to step SP11.

Meanwhile, If values are input into the "TARGET VOLUME" column 48A and the "SETTING" column 48B and the right-arrow button 48D is pressed within the predetermined time frame (SP2:YES), the processor 42 of the management server 6 checks whether or not information entered into the "TARGET VOLUME" column 48A and the "SETTING" column 48B are within the period for which a recovery period is to be set (SP3). If the recovery period entered into the "SETTING" column 48B is not within the period for which a recovery period is to be set (SP3:NO), the processor 42 of the management server 6 displays an error message indicating that the information entered into the relevant columns is not within the period for which a recovery period is to be set on the recovery period setting screen 48 (SP4), and then proceeds to step SP11.

Meanwhile, if information entered into the "TARGET VOLUME" column 48A and the "SETTING" column 48B are within the period for which a recovery period is to be set (SP3:YES), the processor 42 of the management server 6 checks whether or not the period entered into the "SETTING" column 48B overlaps with the recovery period previously set in the "RECOVERY PERIOD LIST" column 48E (SP5). If the period entered into the "SETTING" column 48B does not overlap with the recovery period previously set in the "RECOVERY PERIOD LIST" column 48E (SP5:NO), the processor 42 of the management server 6 proceeds to step SP8.

Meanwhile, if the period entered into the "SETTING" column 48B overlaps with the recovery period previously set in the "RECOVERY PERIOD LIST" column 48E (SP5: YES), the processor 42 of the management server 6 checks whether or not the recovery period previously set in the "RECOVERY PERIOD LIST" column 48E is included in the recovery period entered into the "SETTING" column 48B (SP6). If the recovery period previously set in the "RECOVERY PERIOD LIST" column 48E is included in the recovery period entered into the "SETTING" column 48B (SP6:YES), the processor 42 of the management server 6 deletes information previously set in the "RECOVERY PERIOD LIST" column 48E and included in the recovery period entered into the "SETTING" column 48B (SP7).

Then, the processor 42 of the management server 6 reflects information entered into the "SETTING" column 48B in the "RECOVERY PERIOD LIST" column 48E on the recovery period setting screen 48 (SP8).

Meanwhile, if the recovery period previously set in the "RECOVERY PERIOD LIST" column 48E is not included in the recovery period entered into the "SETTING" column 48B (SP6:NO), the processor 42 of the management server 6 resets the recovery period previously set in the "RECOVERY PERIOD LIST" column 48E to the period excluding the overlapped recovery period, and then reflects information entered into the "SETTING" column 48B in the "RECOVERY PERIOD LIST" column 48E on the recovery period setting screen 48 (SP9).

Thus, when newly entered information is overlapped with the previously set recovery period, the processor 42 of the management server 6 automatically updates to the newly entered information, so that user-friendliness can be improved.

Then, the processor 42 of the management server 6 rearranges information set in the "RECOVERY PERIOD LIST" column 48E in ascending date and time order (SP10).

Following the above, the processor 42 of the management server 6 checks whether or not the OK button 48F is pressed within a predetermined time frame (SP11). If the OK button 48F is not pressed within the predetermined time frame (SP11:NO), the processor 42 of the management server 6 returns to step SP2.

Meanwhile, if the OK button 48F is pressed within the predetermined time frame (SP11:YES), the processor 42 of the management server 6 sends information set in the "RECOVERY PERIOD LIST" column 48E to the first storage device 4 (SP12), and then terminates the recovery period setting screen processing procedure RT1 shown in FIGS. 9 and 10 (SP13).

Figure 11:
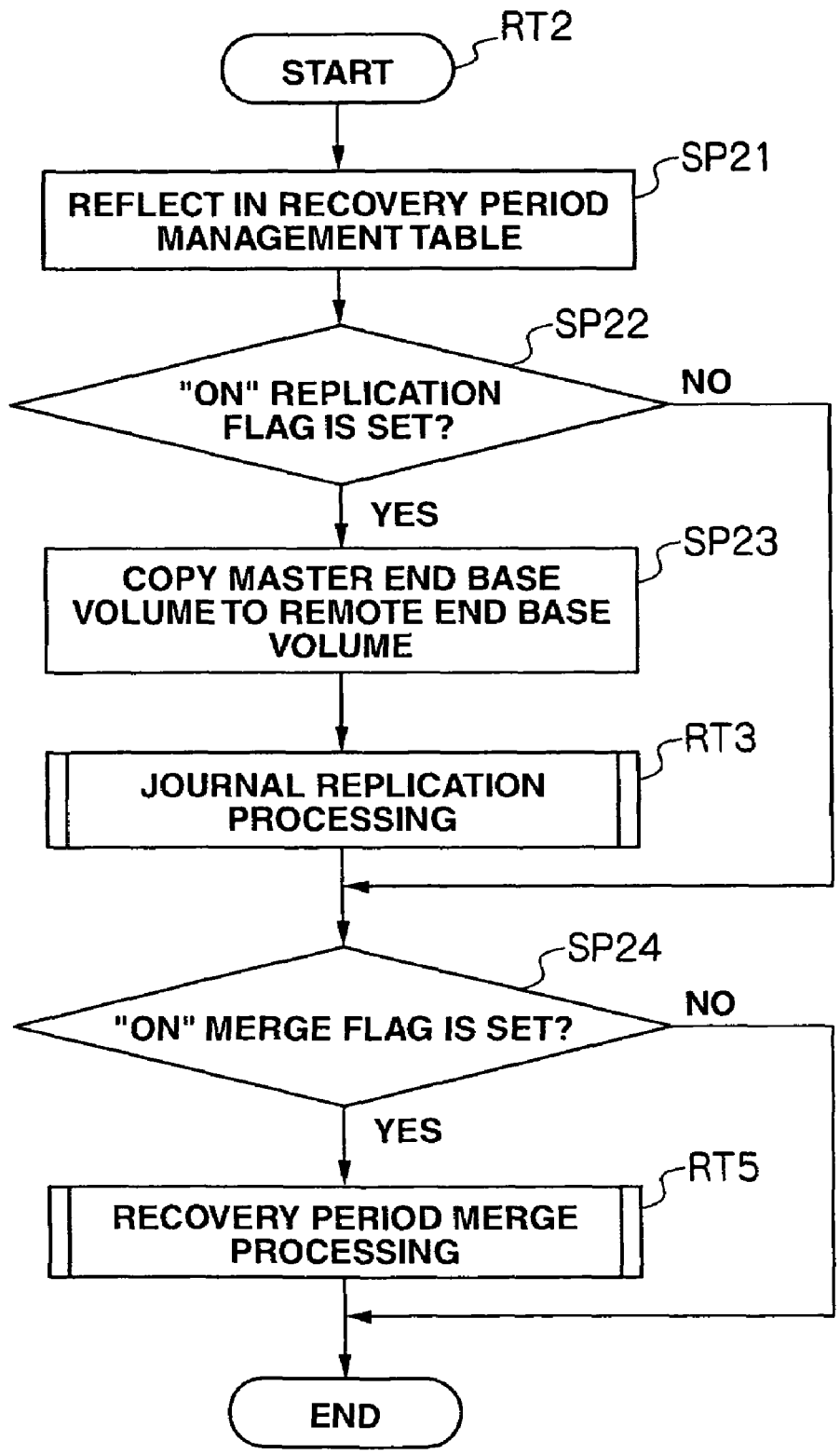
FIG. 11 is a flowchart illustrating a recovery period management processing procedure.

FIG. 11 is a flowchart illustrating an example of concrete processing procedures in the controller 22 of the first storage device 4, and the procedures relate to the recovery period management processing in the first storage device 4 of the storage system 1.

For example, when receiving information set in the "RECOVERY PERIOD LIST" column 48 from the management server 6, the controller 22 of the first storage device 4 executes recovery period management program 31, and reflects information set in the "RECOVERY PERIOD LIST" column 48E in the recovery period management table 37 of the target the primary volume 11 according to the recovery period management processing procedure RT2 shown in FIG. 11 (SP21).

Then, the controller 22 of the first storage device 4 checks whether or not an "ON" replication flag is set for any entry in the recovery period management table 37 with reference to the "REPLICATION FLAG" column 37E in the reflected the recovery period management table 37 (SP22). If an "ON" replication flag is not set for any entry in the recovery period management table 37 (SP22:NO), more specifically, if "OFF" replication flags are set for all the entries in the recovery period management table 37, the controller 22 of the first storage device 4 proceeds to step SP24.

Meanwhile, if an "ON" replication flag is set for any entry in the recovery period management table 37 (SP22:YES), the controller 22 of the first storage device 4 copies data stored in the master end base volume 13 of the target primary volume 11 to the remote end base volume 14 of the second storage device 5 (SP23).

Then, the controller 22 of the first storage device 4 executes journal replication processing for replicating journal data and corresponding update data (RT3). The details of the journal replication processing will be described later below.

The controller 22 of the first storage device 4 checks whether or not an "ON" merge flag is set for any entry in the recovery period management table 37 by referring to the "MERGE FLAG" column 37D (SP24). If an "ON" merge flag is not set for any entry in the recovery period management table 37 (SP24:NO), more specifically, if "OFF" merge flags are set for all the entries in the recovery period management table 37, the controller 22 of the first storage device 4 proceeds to step SP25.

Meanwhile, if an "ON" merge flag is set for any entry in the recovery period management table 37 (SP24:YES), the controller 22 of the first storage device 4 executes recovery period merge processing for updating (merging) journal data and corresponding update data (RT5). The details of the recovery period merge processing will be described later below.

Eventually, the controller 22 of the first storage device 4 terminates the recovery period management processing procedure RT2 shown in FIG. 11 (SP25).

Figure 12:
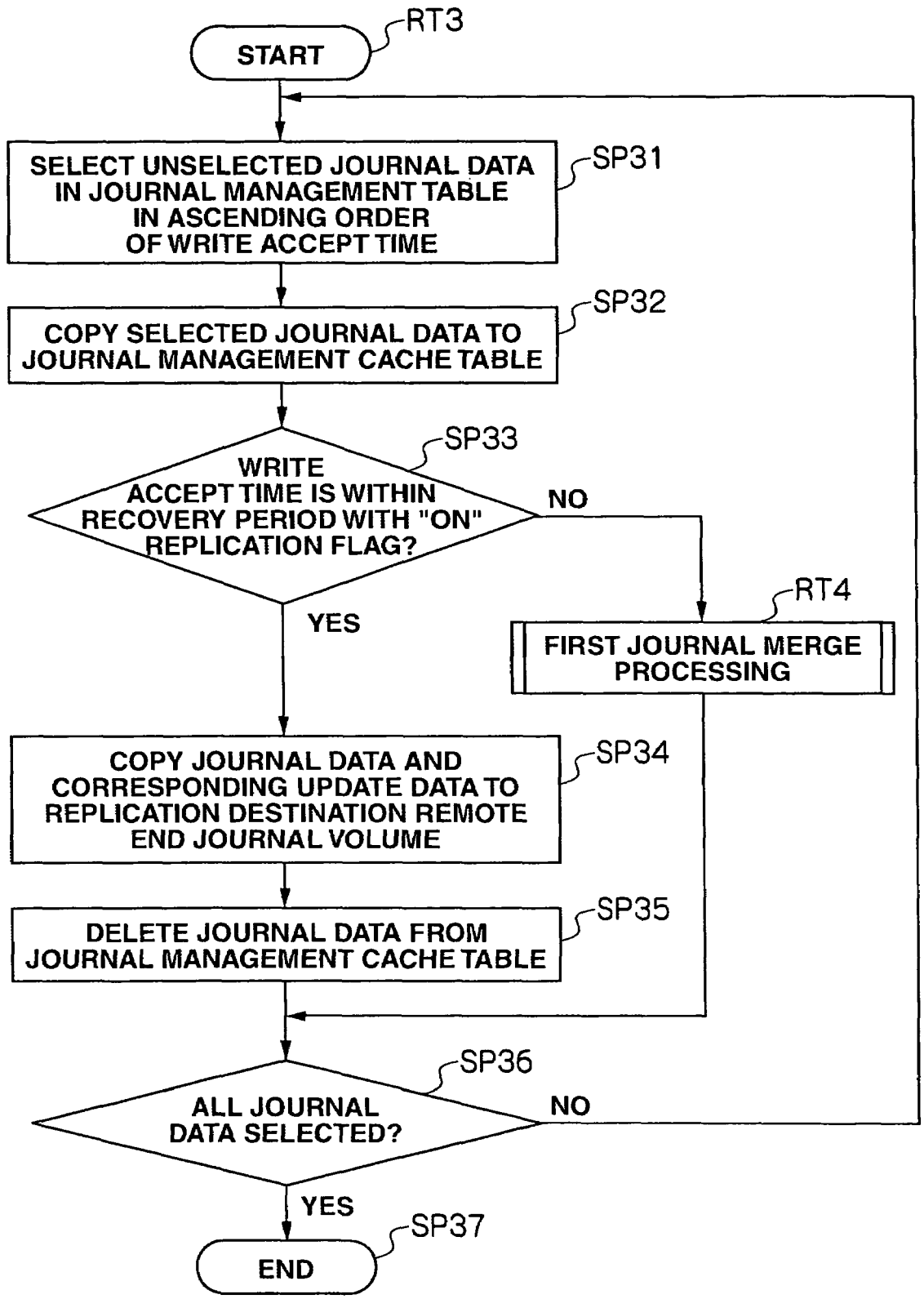
FIG. 12 is a flowchart illustrating a journal replication processing procedure.

FIG. 12 is a flowchart illustrating an example of concrete processing procedures in the controller 22 of the first storage device 4, the procedures relate to journal replication processing in the first storage device 4 of the storage system 1.

For example, when data stored in the master end base volume 13 of the target primary volume 11 is copied to the remote end base volume 14 of the second storage device (SP23), the controller 22 of the first storage device 4 executes the journal replication program 32, and selects from the journal management table 35 of the target primary volume 11, with reference to the "WRITE ACCEPT TIME" column 35B according to the journal replication processing procedure RT3 shown in FIG. 12, the journal data unselected in the aforementioned journal replication processing in descending order of write accepted time (SP31).

Then, the controller 22 of the first storage device 4 copies the selected journal data to the journal management cache table 36 (SP32).

The controller 22 of the first storage device 4 checks whether or not the write accepted time of the selected journal data is within the recovery period of, from among the entries in the recovery period management table 37, an entry whose replication flag is "ON" (SP33). If the write accepted time of the selected journal data is not within the recovery period of an entry whose replication flag is "ON" (SP33:NO), the controller 22 of the first storage device 4 executes first journal merge processing for updating (merging) journal data and corresponding update data (RT4).

Meanwhile, if the write accepted time of the selected journal data is within the recovery period of an entry whose replication flag is "ON" (SP33:YES), the controller 22 of the first storage device 4 copies all the journal data and corresponding update data in the journal management cache table 36 to the remote end journal volume 15 of the second storage device 5 (SP34). Incidentally, the selected journal data, and the journal data with the updated write accepted time updated so that the controller 22 receives a write request and writes update data to the primary volume 11 at the start time of the data restoration necessary period for a user, are stored in the journal management cache table 36.

Meanwhile, the controller 22 of the first storage device 4 deletes all the journal data in the journal management cache table 36 (SP35).

Then, the controller 22 of the first storage device 4 checks whether or not all the journal data in the journal management table 35 in the target primary volume 11 are selected (SP36). If all the journal data are not selected (SP36:NO), the controller 22 of the first storage device 4 returns to step SP31. If all the journal data are selected (SP36:YES), then the controller 22 of the first storage device 4 terminates the journal replication processing procedure RT3 shown in FIG. 12 (SP37).

Figure 13:
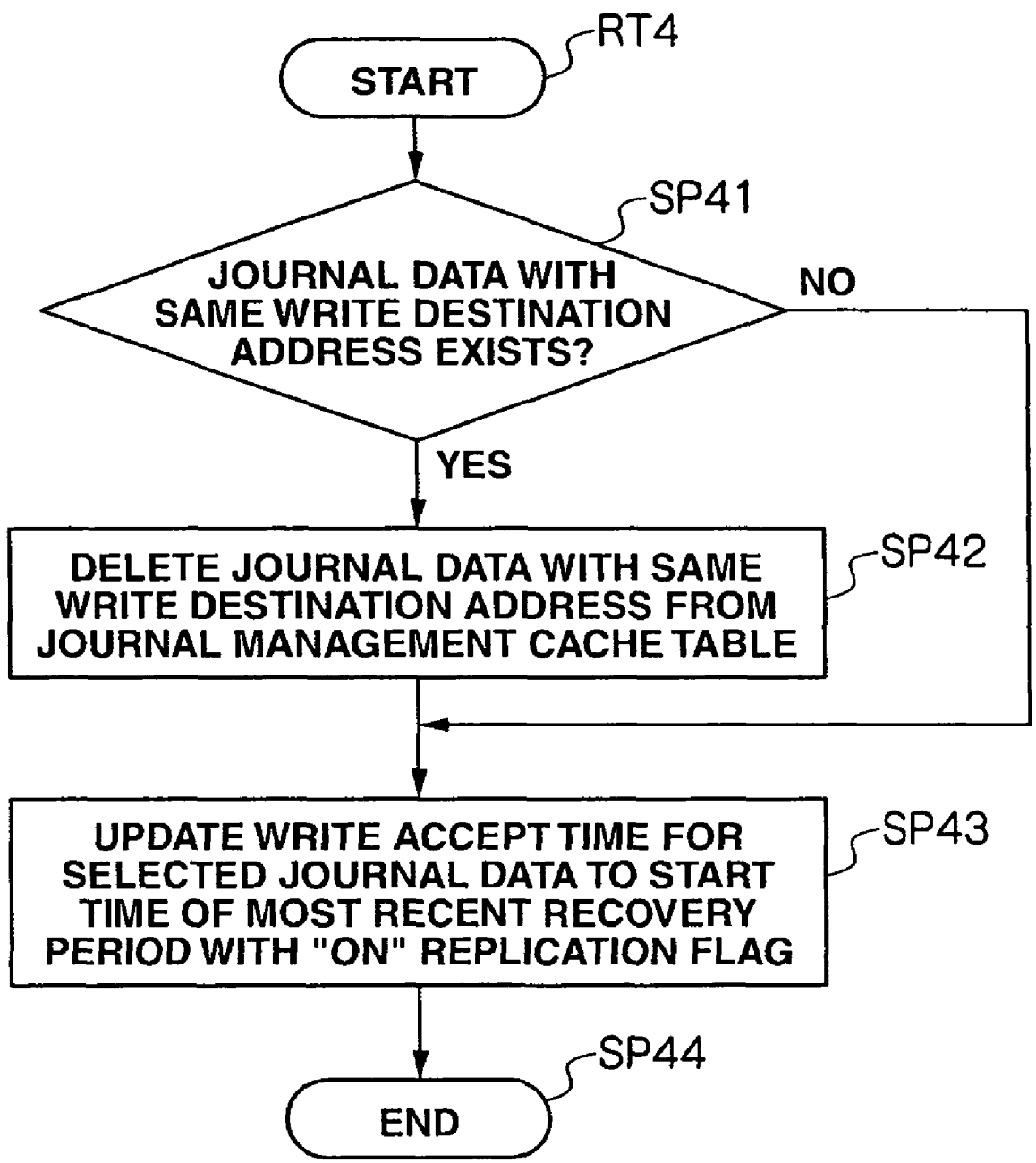
FIG. 13 is a flowchart illustrating a journal merge processing procedure.

FIG. 13 is a flowchart illustrating an example of concrete processing procedures in the controller 22 of the first storage device 4, and the procedures relate to the first journal merge processing in the first storage device 4 of the storage system 1.

For example, if the write accepted time of the selected journal data is within the recovery period of an entry whose replication flag is "ON" (SP33:NO), the controller 22 of the first storage device 4 executes a journal merge program 33, and checks, with reference to the "WRITE DESTINATION ADDRESS" column 36C in the journal management cache table 36 according to the first journal merge processing procedure RT4 shown in FIG. 13, whether or not journal data with the same write destination address as that of the selected journal data, except the selected journal data, exists in the journal management cache table 36 (SP41).

Then, if journal data with the same write destination address as that of the selected journal data, except the aforementioned journal data, does not exist in the journal management cache table 36 (SP41:NO), the controller 22 of the first storage device 4 proceeds to step SP43. If journal data with the same write destination address as that of the selected journal data, except the selected journal data, exists in the journal management cache table 36 (SP41:YES), the controller 22 of the first storage device 4 deletes the journal data with the same write destination address as that of the selected journal data from the journal management cache table 36 (SP42).

In that case, for example, if the selected journal data is journal data with an ID of "0," it indicates that the write destination address of journal data with the ID of "0" is the same "0x00500" address as that of journal data with an ID of "2," so journal data with the ID of "2" is deleted from the journal management cache table 36.

In this way, the controller 22 of the first storage device 4 does not transfer journal data with the same write destination address as that of the selected journal data and corresponding update data to the remote end journal volume 15 of the second storage device 5, and prevents update data in the data restoration unnecessary recovery period for a user from being held in the remote end journal volume 15, so that the capacity of the remote end journal volume 15 can be efficiently utilized.

The controller 22 of the first storage device 4 updates the write accepted time of the selected journal data to the start time for the recovery period, which is the most recent period after the aforementioned write accepted time, for which an "ON" replication flag is set (SP43).

In that case, for example, in FIG. 6, if the journal data for which a "1" ID is set is the selected journal data, the write accepted time "2007/8/1 12:00" of the aforementioned journal data is updated to the start time "2007/8/1 15:00" of the most recent recovery period for which an "ON" replication flag is set.

Eventually, the controller 22 of the first storage device 4 terminates the first journal merge processing procedure RT4 shown in FIG. 13 (SP44).

Figure 14:
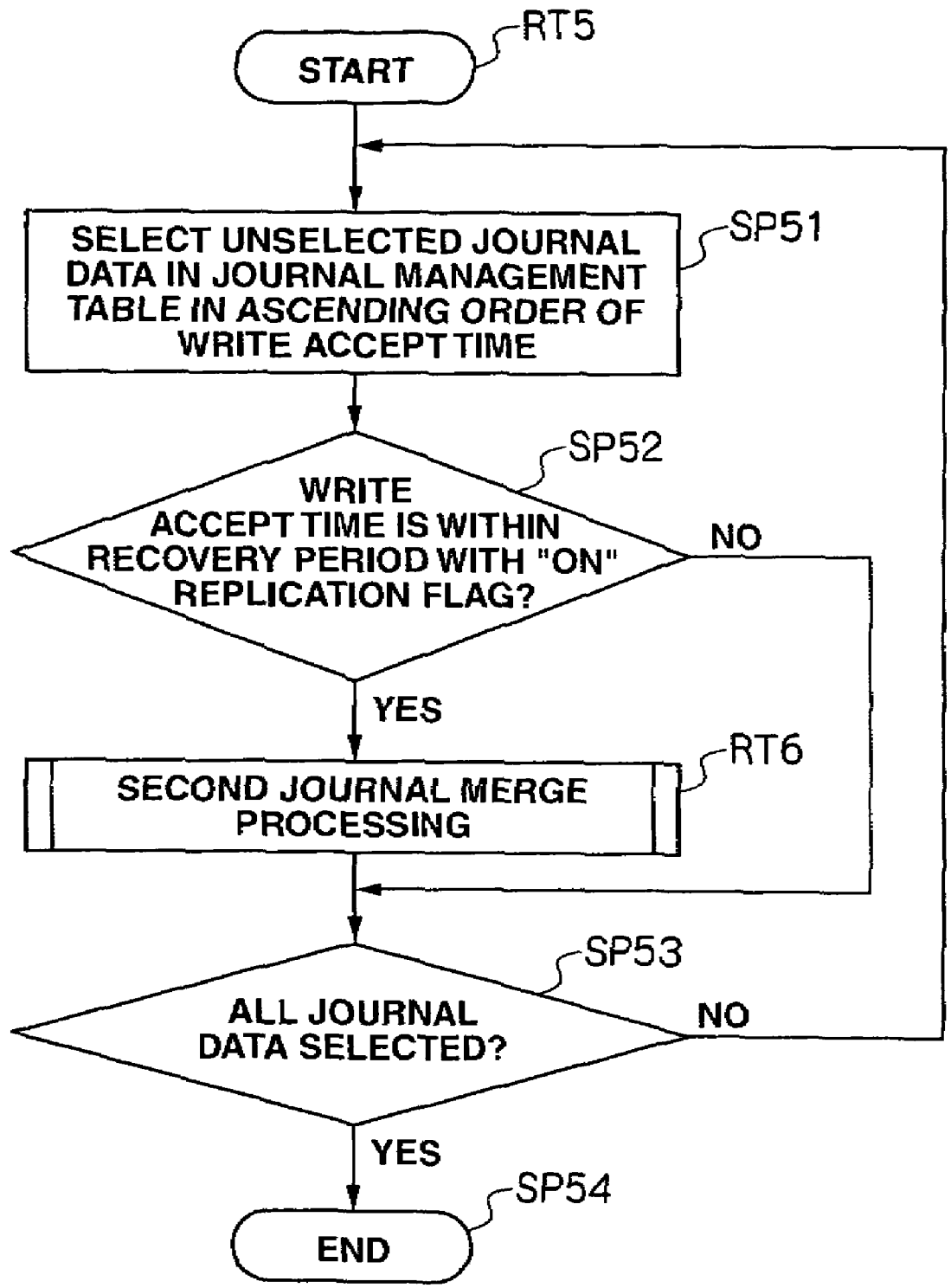
FIG. 14 is a flowchart illustrating a recovery period merge processing procedure.

FIG. 14 is a flowchart illustrating an example of concrete processing procedures in the controller 22 of the first storage device 4, and the procedures relate to recovery period merge processing in the first storage device 4 of the storage system 1.

For example, if an "ON" merge flag is set for any entry in the recovery period management table 37 (SP24:YES), the controller 22 of the first storage device 4 executes a recovery period merge program 34, and selects from the journal management table 35 of the target primary volume 11, with reference to the "WRITE ACCEPT TIME" column 35B according to the recovery period merge processing procedure RT5 shown in FIG. 14, the journal data unselected in the aforementioned recovery period merge processing in descending order of write accepted time (SP51).

Then, the controller 22 of the first storage device 4 checks whether or not the write accepted time of the selected journal data is within the recovery period of, from among the entries in the recovery period management table 37, an entry whose merge flag is "ON" (SP52). If the write accepted time of the selected journal data is not within the recovery period of an entry whose merge flag is "ON" (SP52:NO), the controller 22 of the first storage device 4 proceeds to step SP53.

Meanwhile, if the write accepted time of the selected journal data is within the recovery period of an entry whose merge flag is "ON" (SP52:YES), the controller 22 of the first storage device 4 executes second journal merge processing for updating (merging) journal data and corresponding update data (RT6).

Then, the controller 22 of the first storage device 4 checks whether or not all the journal data in the journal management table 35 in the target primary volume 11 are selected (SP53). If all the journal data are not selected (SP53:NO), the controller 22 of the first storage device 4 returns to step SP51. If all the journal data are selected (SP53:YES), then the controller 22 of the first storage device 4 terminates the recovery period merge processing procedure RT5 shown in FIG. 14 (SP54).

Figure 15:
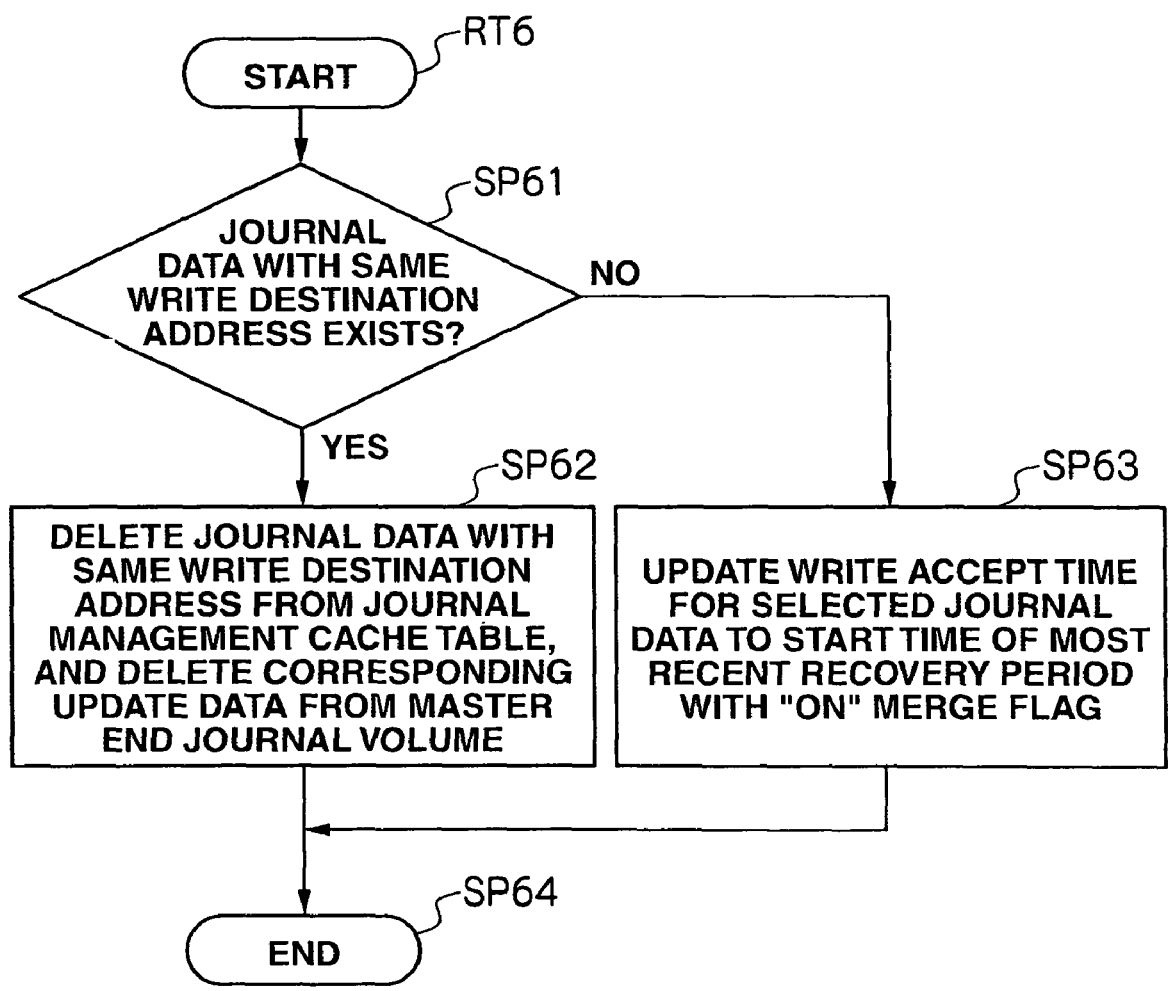
FIG. 15 is a flowchart illustrating a journal merge processing procedure.

FIG. 15 is a flowchart illustrating an example of concrete processing procedures in the controller 22 of the first storage device 4, and the procedures relate to second journal merge processing in the first storage device 4 of the storage system 1.

For example, if the write accepted time of the selected journal data is within the recovery period of an entry whose merge flag is "ON" (SP52:YES), the controller 22 of the first storage device 4 executes the journal merge program 33, and checks, by referring to the "WRITE DESTINATION ADDRESS" column 35C in the journal management table 35 according to the second journal merge processing procedure RT6 shown in FIG. 15, whether or not journal data with the same write destination address as that of the selected journal data, except the selected journal data, exists in the journal management table 35 (SP61).

Then, if journal data with the same write destination address as that of the selected journal data, except the aforementioned journal data, exists the (SP41:YES), the controller 22 of the first storage device 4 deletes the journal data with the same write destination address as that of the aforementioned selected journal data from the journal management cache table 36, and deletes the corresponding update data from the master end journal volume 12 (SP62).

In that case, for example, in FIG. 5, if the journal data for which a "0" ID is set is the selected journal data, it indicates that the write destination address of journal data with an ID of "0" is the same "0x00500" address as that of journal data with an ID of "8," so journal data with the ID of "8" is deleted from the journal management cache table 36, and update data that corresponds to the journal data with the ID of "8" is deleted from the master end journal volume 12.

Thus, the controller 22 of the first storage device 4 deletes journal data and corresponding update data in the recovery data restoration unnecessary period for a user, the journal data and the corresponding update data have the same write destination address as that of the aforementioned selected journal data. Therefore, journal data and corresponding update data in the recovery data restoration unnecessary period for a user are prevented from being held in the master end journal volume 12, so that the capacity of the master end journal volume 12 can be efficiently utilized.

Meanwhile, if journal data with the same write destination address as that of the selected journal data, except the selected journal data, does not exist in the journal management table 35 (SP61:NO), the controller 22 of the first storage device 4 updates the write accepted time of the selected journal data to the start time of the recovery period, which is the most recent period after the aforementioned write accepted time, for which an "ON" merge flag is set (SP63).

In that case, for example, in FIG. 5, if the journal data for which a "17" ID is set is the selected journal data, the write accepted time "2007/8/1 12:00" of the aforementioned journal data is updated to the start time "2007/8/1 15:00" of the most recent recovery period for which an "ON" merge flag is set.

Eventually, the controller 22 of the first storage device 4 terminates the second journal merge processing procedure RT6 shown in FIG. 15 (SP64).

As described above, in the storage system 1, update data from the data restoration unnecessary period for a user is updated (merged) in the master end journal volume 12.

Accordingly, a generation-managed and redundant recovery period, in which a storage capacity is efficiently utilized depending on the importance of data, can be achieved, and consecutive recovery periods can be managed by, for example, applying a journal volume to the recovery period in a particular generation.

More specifically, in the storage system 1, as shown in FIG. 16, data from six days ago is stored in the master end base volume 13, and when updating (merging) update data from five days ago and four days ago as the data restoration unnecessary period for a user (unnecessary period), update data D1-D4 can be deleted. Therefore, the update data amount used in the master end journal volume 12 can be reduced by "4" pieces of update data, and the capacity of the master end journal volume 12 can be more efficiently utilized by that amount.

Also, in the storage system 1, update data in the period designated by a user during which data restoration is not necessary for a user is updated (merged) in the master end journal volume 12, and update data in the data restoration necessary period for a user is transferred to the remote end journal volume 15.

Accordingly, a generation-managed and redundant recovery period, in which a storage capacity is efficiently utilized depending on the importance of data, can be achieved, and consecutive recovery periods can be managed by, for example, applying a journal volume to the recovery period in a particular generation. Also, minimum journal data is backed up so that the bandwidth of backup volume and the used amount of a backup destination volume can be efficiently utilized.

More specifically, in the storage system 1, as shown in FIG. 17, data of six days ago is stored in the master end base volume 13, and when updating (merging) update data of five days ago and four days ago as the data restoration unnecessary period for a user (unnecessary period) and backing up update data of three days ago and two days ago as the data restoration necessary period for a user (important period), update data D11-D20 can be deleted. Therefore, the update data amount used in the remote end journal volume 15 can be reduced by "10" pieces of update data, and the capacity of the remote end journal volume 15 can be more efficiently utilized by that amount. Also, in the storage system 1, the amount of update data transferred to the remote end journal volume 15 can be reduced by "10" pieces of the transferred amount of update data, and the bandwidth of the storage network 3 can be more efficiently utilized by that amount.

Incidentally, in the present embodiment, the primary volume 11, the master end journal volume 12 and the master end base volume 13 are provided to manage data. It should be understood that the present invention is not limited to the above-described embodiment, but also it can be applied to various embodiments such as a case when managing update data in the primary volume 11 by writing it to the master end journal volume 12 in a chronologically identifiable manner, without providing the master end base volume 13, etc.

Also in the present embodiment, the start time of a recovery period, the end time of a recovery period, an "ON" or "OFF" merge flag and an "ON" or "OFF" replication flag are listed in the "RECOVERY PERIOD LIST" column 48E. It should be understood that the present invention is not limited to the above-described embodiment, but also it can list other various information such as the restorable period of a primary volume, a restorable point in time and the remaining amount in a journal volume, etc.

Furthermore, in the present embodiment, when receiving a recovery period setting instruction in accordance with an operating unit (not shown) operated by the user of the management server 6, the recovery period setting screen processing is executed. It should be understood that the present invention is not limited to the above-described embodiment, but also that a storage device may report to a management server that a journal volume needs to be merged depending on the remaining amount of the journal volume, so the recovery period setting screen processing can be executed using the aforementioned method or other similar methods.

The present invention can be broadly applied in storage devices managing the backups or the restoration of data in storage systems.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system comprising:
    a first storage device including a first data volume for storing data sent from a host computer and a first journal volume to which update data in the first data volume is written in a chronologically identifiable manner,
    a second storage device including a second data volume and a second journal volume that holds a replica of the first data volume and the first journal volume, and
    a management device managing the first storage device, wherein
        the first storage device comprises a recovery period management table including a start time of a recovery period, an end time of the recovery period, a merge flag which indicates whether or not the update data in the first journal volume in the recovery period is to be merged, and a replication flag which indicates whether or not the update data in the first journal volume in the recovery period is to be merged and transferred,
    wherein if the replication flag of a first recovery period is on, the first storage device sends the update data in the first journal volume written during the first recovery period to the second storage device,
    wherein if the replication flag of the first recovery period is off, the first storage device only sends the latest update data among the update data with the same write destination address which was written during the first recovery period,
    wherein if the merge flag of a second recovery period is on, the first storage device deletes the update data in the first journal volume except for the latest update data among the update data with the same write destination address which is written in the first journal volume during the second recovery period.

2. The storage system according to claim 1, wherein:
    the first storage device merges update data in the first journal volume, and transfers the merged update data from the first journal volume to the second journal volume.

3. The storage system according to claim 1, wherein:
    the first storage device updates a write accepted time of when the update data is sent from the host computer to the start time of the recovery period.

4. A storage device including a data volume for storing data sent from a host computer and a journal volume to which update data in the data volume is written in a chronologically identifiable manner, comprising:
    a recovery period management table including a start time of a recovery period, an end time of the recovery period, a merge flag which indicates whether or not the update data in the journal volume in the recovery period is to be merged, and a replication flag which indicates whether or not the update data in the journal volume in the recovery period is to be merged and transferred,
    wherein if the replication flag of a first recovery period is on, the storage device sends the update data in the journal volume written during the first recovery period to a second storage device,
    wherein if the replication flag of the first recovery period is off, the storage device only sends the latest update data among the update data with the same write destination address which was written during the first recovery period,
    wherein if the merge flag of a second recovery period is on, the storage device deletes the update data in the journal volume except for the latest update data among the update data with the same write destination address which is written in the journal volume during the second recovery period, and
    an update unit configured to merge update data in the journal volume that was written during the recovery period.

5. The storage device according to claim 4, wherein:
    the update unit is further configured to merge the update data in the journal volume that was written during the recovery period, and transfer the merged update data from the storage device to an external device.

6. The storage device according to claim 4, wherein:
    the update unit updates a write accepted time of when the update data is sent from the host computer to the start time of the recovery period.

7. A data updating method for a storage device that includes a data volume for storing data sent from a host computer and a journal volume to which update data in the data volume is written in a chronologically identifiable manner, comprising:
    storing a start time of a recovery period an end time of the recovery period, a merge flag which indicates whether or not the update data in the journal volume in the recovery period is to be merged, and a replication flag which indicates whether or not the update data in the journal volume in the recovery period is to be merged and transferred in a recovery period management table,
    sending the update data in the journal volume written during a first recovery period to a second storage device, if the replication flag of the first recovery period is on,
    sending only the latest update data among the update data with the same write destination address which was written during the first recovery period, if the replication flag of the first recovery period is off,
    deleting the update data in the journal volume except for the latest update data among the update data with the same write destination address which is written in the journal volume during a second recovery period, if the merge flag of the second recovery period is on, and
    merging the update data in the journal volume that was written during the recovery period.

8. The data updating method according to claim 7, further comprising:
    transferring the merged update data from the storage device to an external device.

9. The data updating method according to claim 7, further comprising:
    updating a write accepted time of when the update data is sent from the host computer to the start time of the recovery period.

* * * * *